Figure 1:
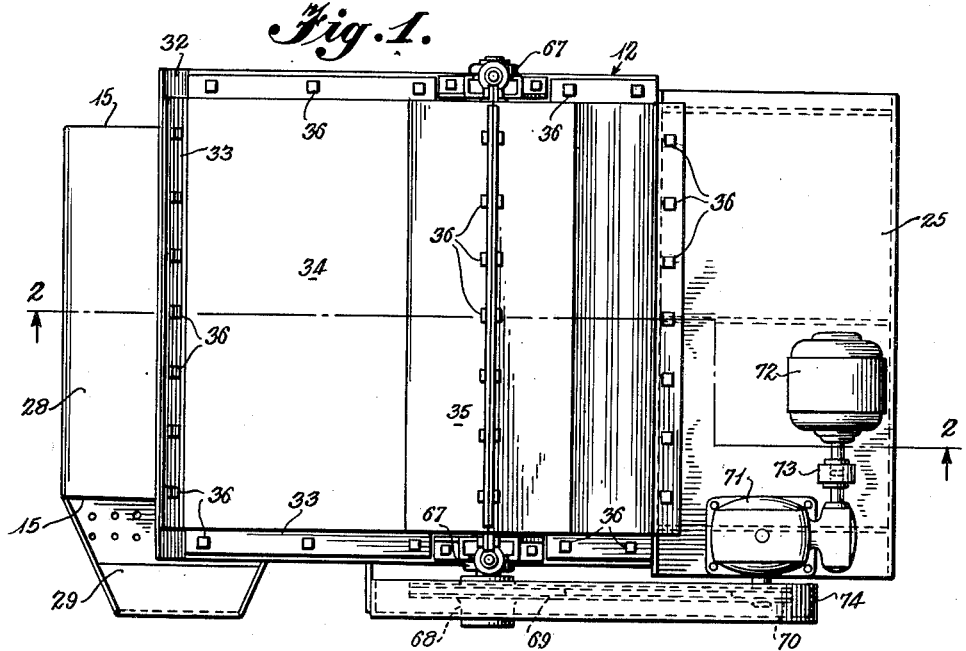

March 9, 1954 C. J. BENNER, JR 2,671,563
TRASH SCREEN
Filed May 2, 1951 7 Sheets-Sheet 1

INVENTOR
Charles J. Benner, Jr.
BY
ATTORNEY

March 9, 1954  C. J. BENNER, JR  2,671,563
TRASH SCREEN
Filed May 2, 1951  7 Sheets-Sheet 2

INVENTOR
Charles J. Benner, Jr.
BY
ATTORNEY

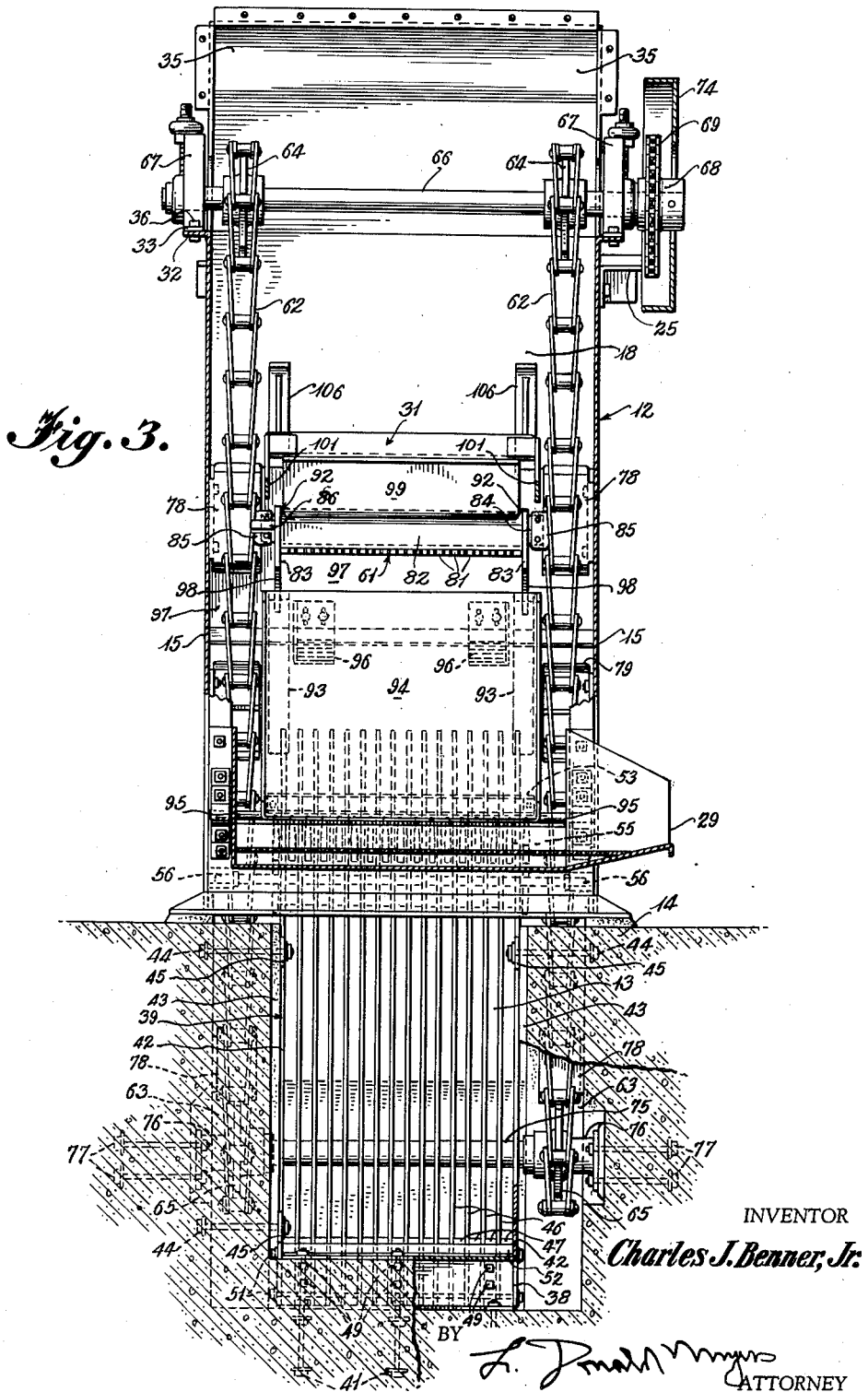

March 9, 1954  C. J. BENNER, JR  2,671,563
TRASH SCREEN

Filed May 2, 1951  7 Sheets-Sheet 4

INVENTOR
Charles J. Benner, Jr.
BY
ATTORNEY

March 9, 1954  C. J. BENNER, JR  2,671,563
TRASH SCREEN

Filed May 2, 1951  7 Sheets-Sheet 5

INVENTOR
Charles J. Benner, Jr.
BY
ATTORNEY

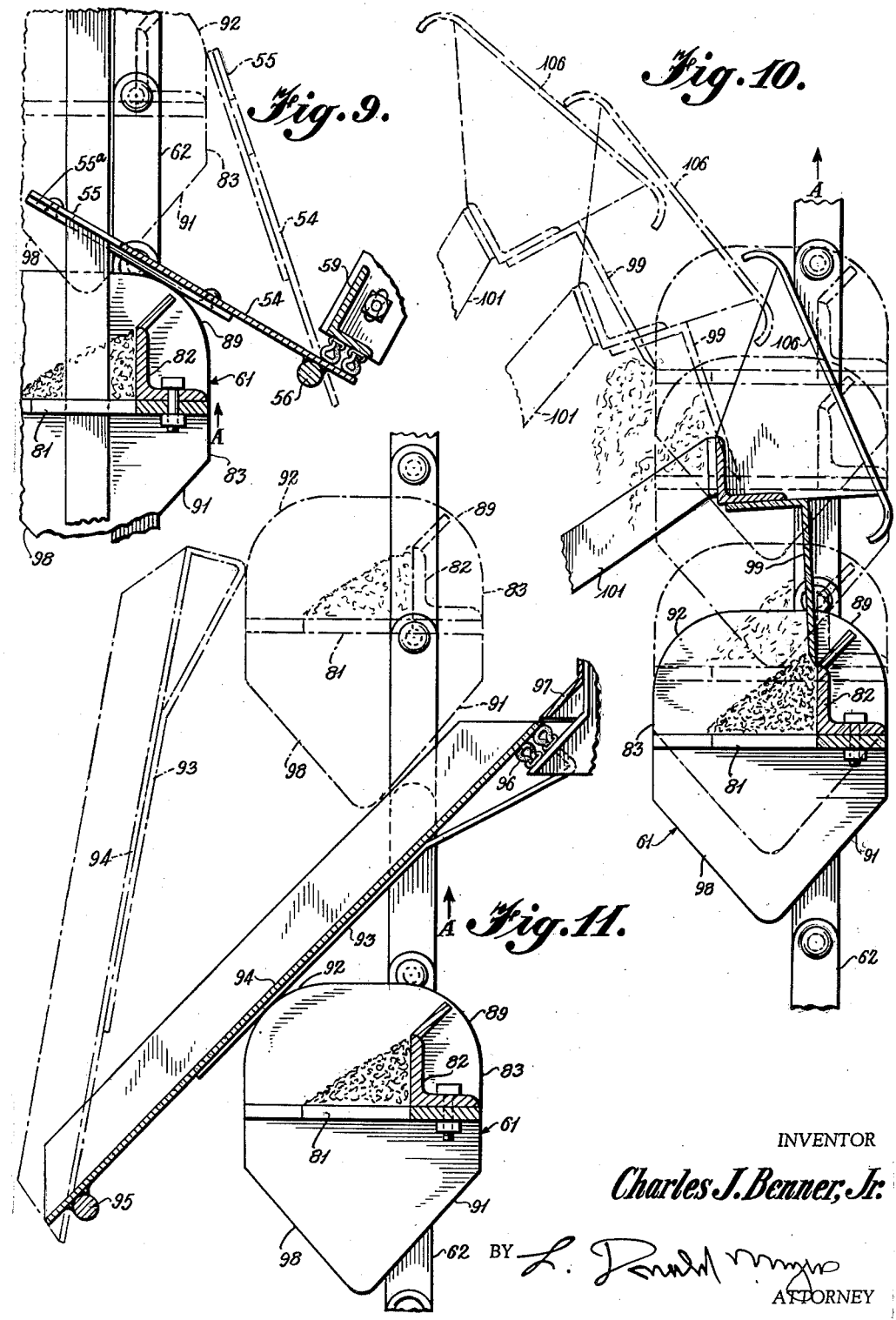

March 9, 1954  C. J. BENNER, JR  2,671,563
TRASH SCREEN
Filed May 2, 1951  7 Sheets-Sheet 7
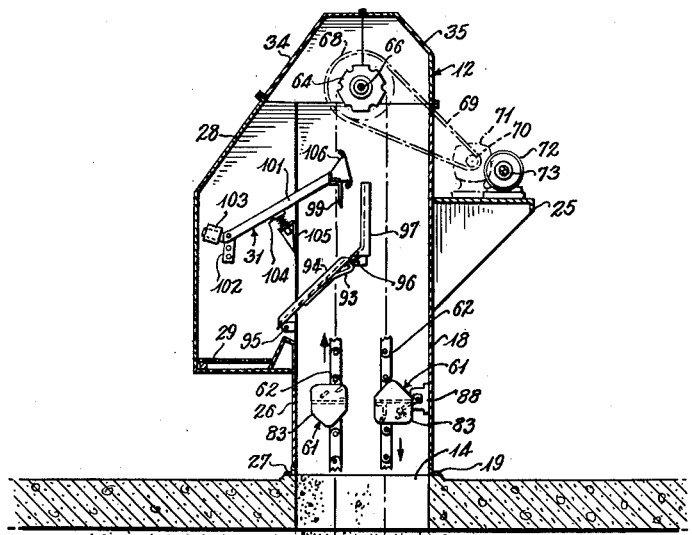
Fig. 12.
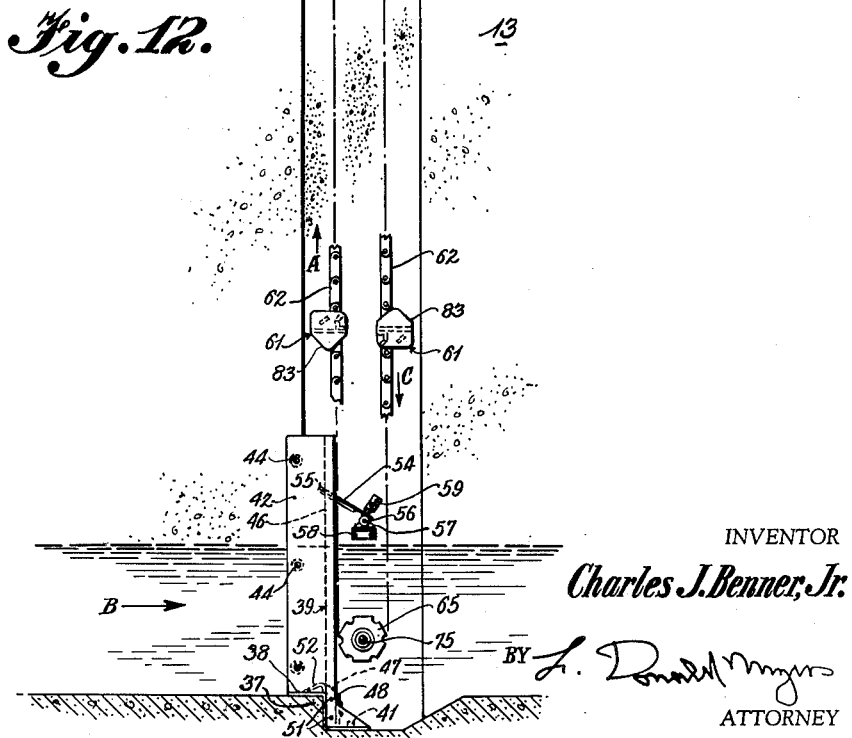
INVENTOR
*Charles J. Benner, Jr.*
BY
ATTORNEY Patented Mar. 9, 1954

2,671,563

UNITED STATES PATENT OFFICE 2,671,563

TRASH SCREEN

Charles J. Benner, Jr., North Hills, Pa., assignor to Link-Belt Company, a corporation of Illinois Application May 2, 1951, Serial No. 224,100

12 Claims. (Cl. 210—176)

This invention relates to new and useful improvements in trash screens, and deals more specifically with mechanically cleaned, vertical bar type trash screens.

The use of bar type screens for the removal of trash and other large solids from water and sewage under treatment has become increasingly widespread in recent years and serves to prevent damage to the mechanical equipment of water, sewage and industrial waste treatment plants through which the water subsequently flows. In such installations, a large portion of the screen itself is submerged in the water or sewage and the screen cleaning rake and its carrier chain, or similar device must, therefore, pass below the surface of the water through the lower portion of its path of travel. Access to the submerged portions of the screen and cleaning device is difficult and necessitates suspending operation of the treatment unit so that it is most important that the screen and cleaning device be possessed of long wearing characteristics with a minimum of maintenance. It is also important that the screen and cleaning device be so arranged as to substantially preclude the possibility of failure due to jamming or otherwise stopping movement of the cleaning device.

The primary object of the invention is to provide a vertical bar type trash screen which is so constructed as to practically eliminate any chance of the bar cleaning mechanism becoming jammed or the bars being clogged with floating material, and which is so vertically positioned or arranged as to minimize the amount of horizontal space required for its installation and the friction developed between the relatively movable cleaning rakes and screening bars and between the rake carrying chains and their guides with the result that wearing of parts and power consumption are substantially reduced.

A further object of the invention is the provision of a novel way of mounting and supporting the vertical bars which form the screening rack.

A further object of the invention is to provide a novel way of mounting the vertical bars which form the screening rack and supporting their upper end portions in such a manner as to permit movement of the bar cleaning rakes along the entire lengths of the bars without interference between the rakes and supporting mechanism.

A still further object of the invention is to provide a vertical bar type trash screen which is so constructed that the cleaning rakes are laterally supported while engaging the screening bars and will in turn afford lateral support for the bars.

Still another object of the invention is to provide a vertical bar type trash screen, the cleaning mechanism of which is so constructed as to afford lateral support for the bars while removing the refuse therefrom, to carry the refuse from the bars to a point of discharge in such a manner as to eliminate any accidental release of the refuse to the screened water, and to automatically and positively remove the refuse from the cleaning mechanism at the point of discharge.

A still further object of the invention is to provide a vertical bar type trash screen, the bars of which are mounted and supported in a novel manner and the cleaning mechanism of which is so constructed that its submerged portion lies substantially entirely within the water that has passed through the screening rack.

A further object of the invention is to provide a trash screen which is so constructed that the top of the screening rack may terminate at any desired distance below the trash discharge housing to permit such trash screens to be readily adapted for installation at different locations where the distance between the floor and the maximum water level may vary.

Other objects and advantages of the invention will be apparent during the course of the following description.

Figure 4:
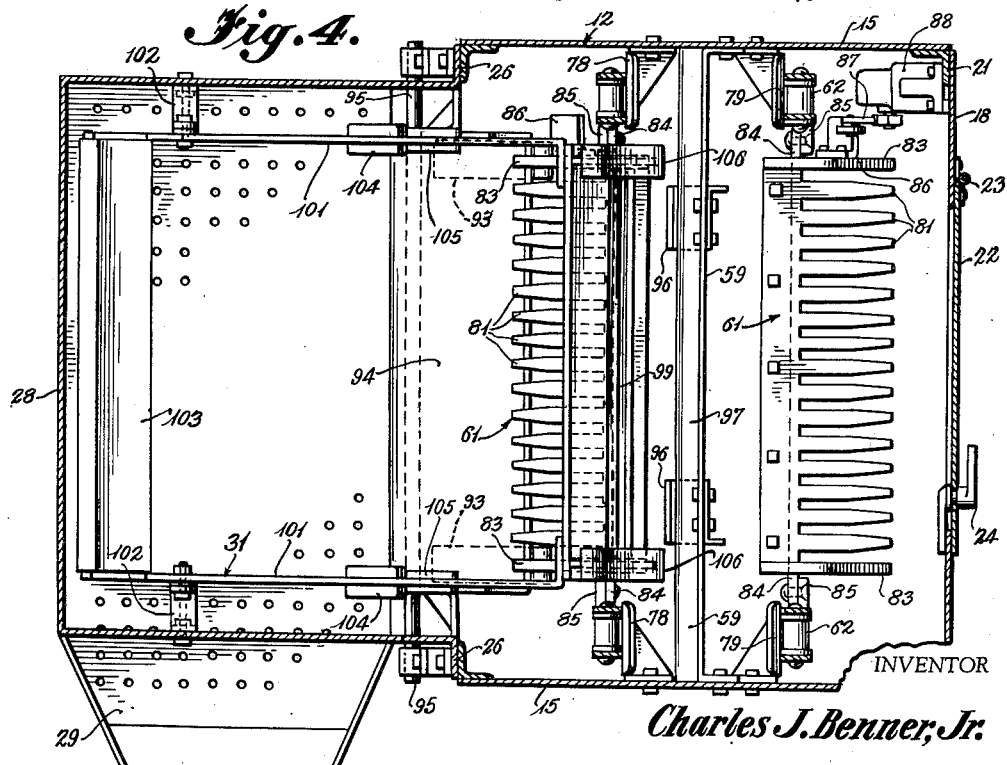
Figure 2:
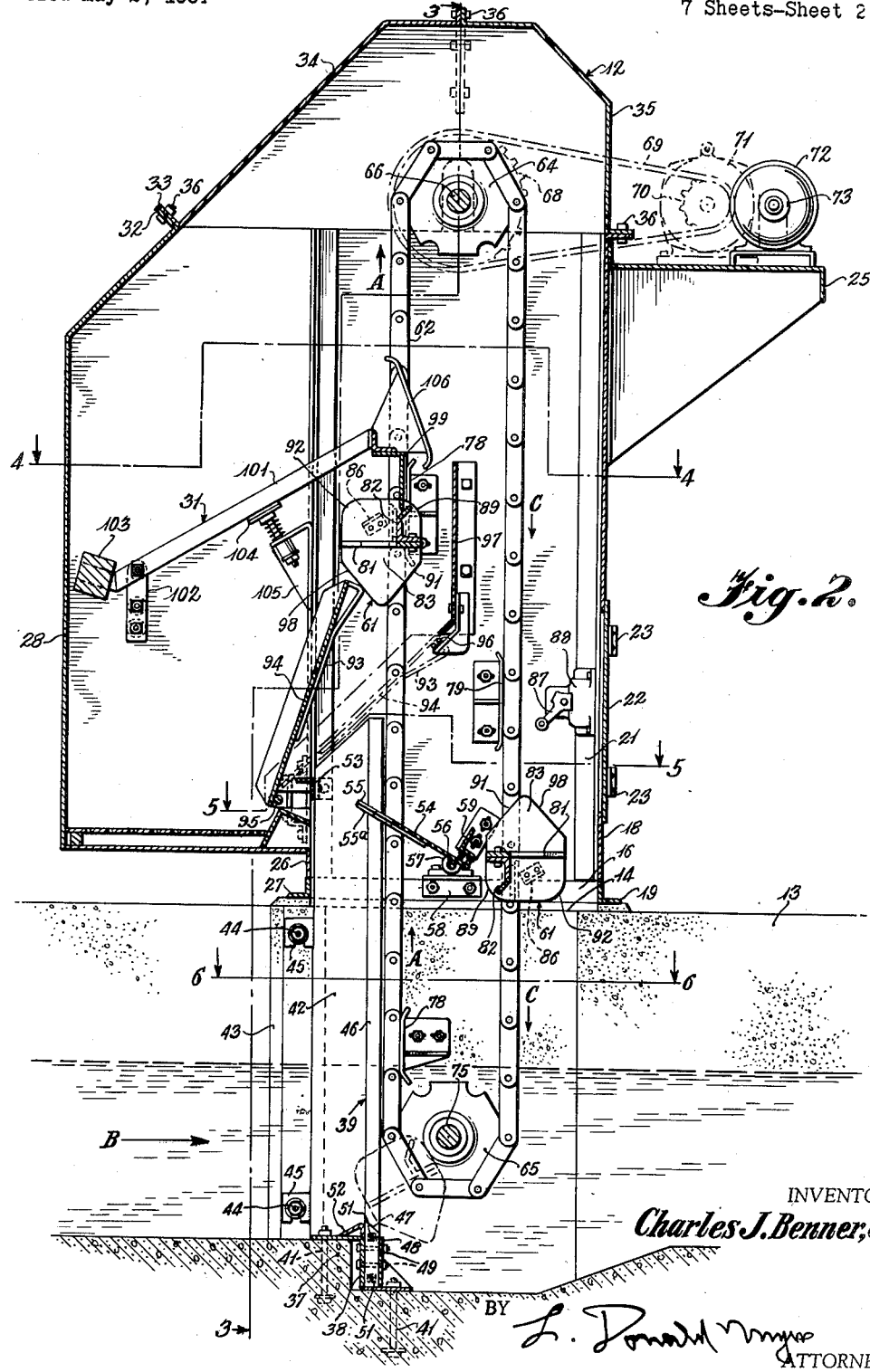
Figure 5:
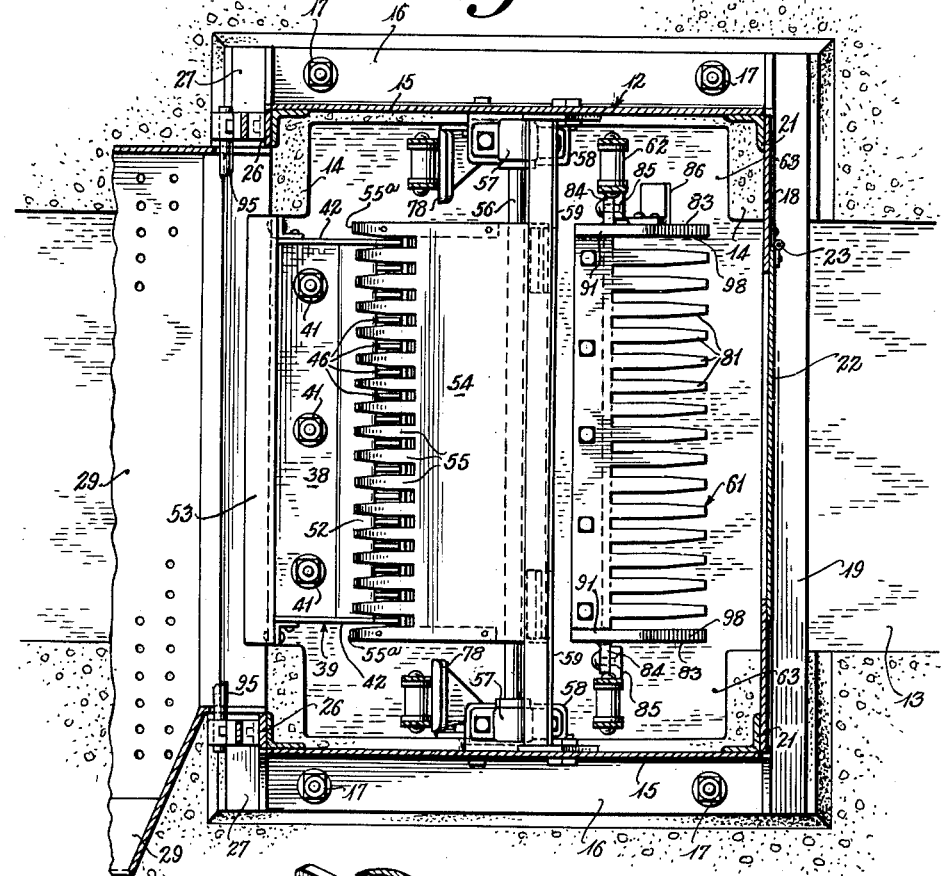
Figure 8:
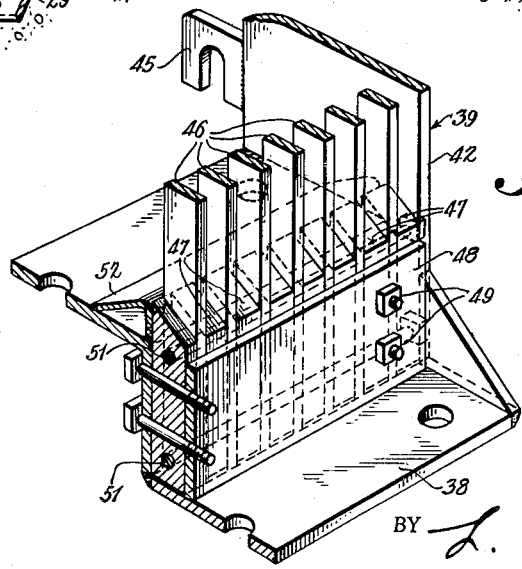
Figure 6:
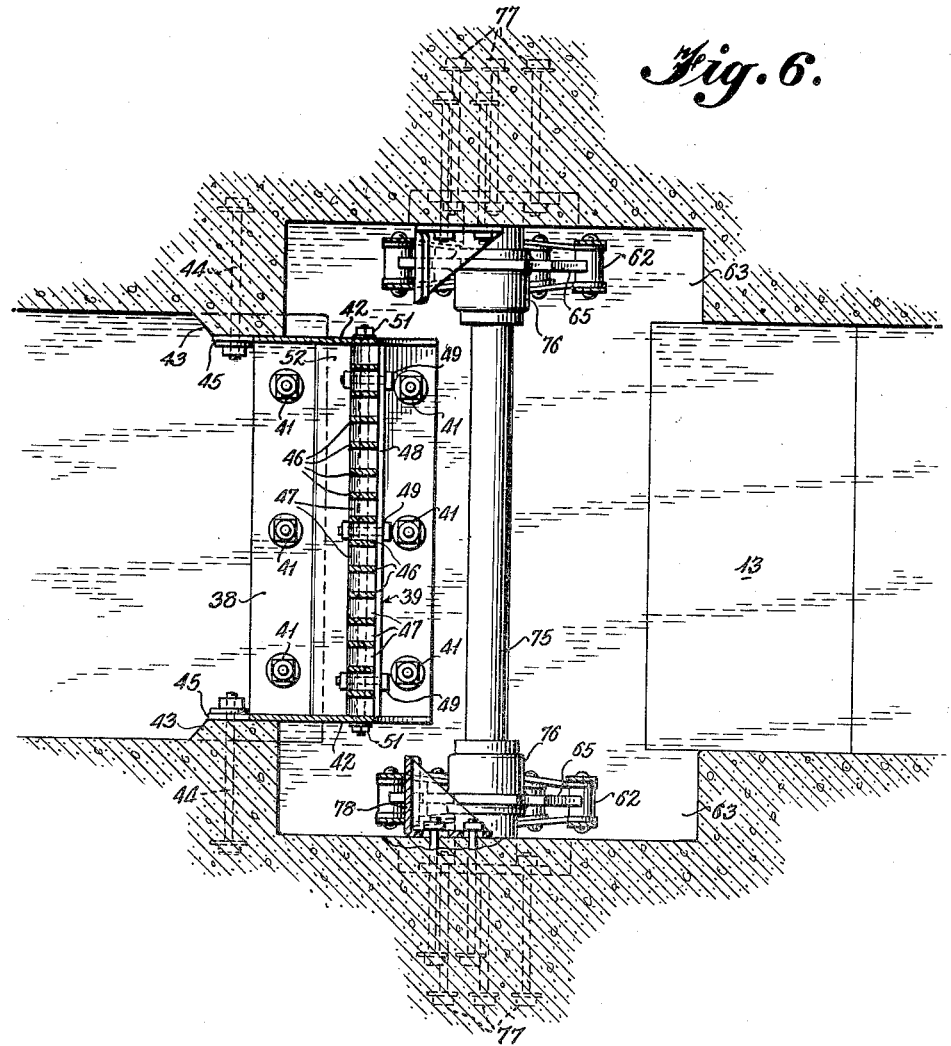
Figure 7:
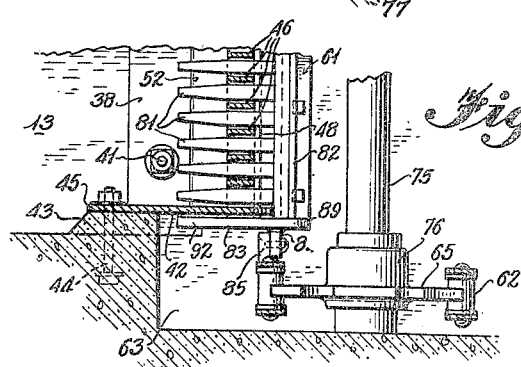

In the accompanying drawings forming a part of this specification, and in which like reference characters are employed to designate like parts throughout the same, Figure 1 is a top plan view of a trash screen embodying the invention, Figure 2 is a vertical sectional view taken on line 2—2 of Fig. 1, Figure 3 is a vertical sectional view taken on line 3—3 of Fig. 2, Figure 4 is a horizontal sectional view taken on line 4—4 of Fig. 2, Figure 5 is a horizontal sectional view taken on line 5—5 of Fig. 2, Figure 6 is a horizontal sectional view taken on line 6—6 of Fig. 2, Figure 7 is a fragmentary sectional view taken on line 6—6 of Fig. 2 and showing one cleaning rake in its screen cleaning position, Figure 8 is a fragmentary perspective view showing a part of the screen bar supporting structure, Figure 9 is a fragmentary vertical sectional view showing the coaction of the rake cams and bar spacing element, Figure 10 is a fragmentary vertical sectional view showing the coaction of the rake and wiper element, Figure 11 is a fragmentary vertical sectional view showing the coaction of the rake cams and deflector plate, and Figure 12 is a vertical sectional view of a modified form of trash screen embodying the invention.

In the drawings, wherein for the purpose of illustration is shown the preferred embodiment of this invention, and first particularly referring to Figs. 1 to 5, inclusive, there is shown a screen housing 12 encasing the upper part of the screen structure. The housing 12 bridges a channel 13, through which the water to be screened flows, and rests upon a foundation 14 forming a portion of the channel walls. Side walls 15 of the housing, on opposite sides of the channel 13, are provided with angle iron bases 16 which rest upon and are connected to the foundation 14. The downstream or back wall 18 of the housing is provided with an angle iron base 19 spanning the channel 13 and having its end portions resting upon the foundation 14. The back wall 18 and the side walls 15 have their adjacent vertical edges connected by angle irons 21. The lower portion of the back wall 18 is provided with an access opening normally covered by a door 22 which is mounted on hinges 23 and maintained in its closed position by a latch mechanism 24.

A drive unit supporting platform 25 is welded, or otherwise suitably connected, to the upper portion of the back wall 18 and projects horizontally outwardly therefrom.

The upstream or front wall 26 of the housing is provided with an angle iron base 27 similar to that of the back wall 18. The front wall 26, however, projects forwardly from the upstream edges of the side walls 15 to form an overhanging portion 28 on the housing 12. This overhanging portion 28 provides in its lower portion a screening pan 29 and encases a portion of the wiper mechanism 31 which will be more fully described in a later paragraph.

The upper edges of the front, back and side walls, 26, 18, and 15, respectively, are flanged outwardly at 32 for connection to the opposing flanges 33 on the front top section 34 and rear top section 35 of the housing 12. The front and rear top sections 34 and 35, respectively, are fastened together and to the flanges 32 of the walls of the housing by bolts 36 which may be removed to provide access to the upper portion of the interior of the housing 12.

The foundation 14 is offset both downwardly and outwardly from the channel 13 so that a stepped increase in the depth of the channel occurs beneath the housing 12. As illustrated in Figs. 2, 3, and 5 to 8, inclusive, the step 37 in the bottom of the channel 13 receives the similarly stepped base plate 38 of the unitary bar rack 39. The base plate 38 is securely anchored to the step 37 by bolts 41. Vertical side plates 42 are welded or otherwise suitably connected to the opposite ends of the base plate 38 and are anchored to concrete shoulders 43 on the side walls of the channel 13 by bolts 44 which engage the notched lugs 45 on the upstream edges of the side plates. The notches in the lugs 45 permit vertical movement of the bar rack 39 into and out of its position in the channel 13 after the anchor bolts 41 and 44 have been set into the foundation 14.

A plurality of vertical screen bars 46 are arranged in horizontally spaced relationship between the side plates 42 with their lower end surfaces resting upon the lower horizontal surface of the stepped base plate 38 and the upstream edges at their lower end portions engaging the vertical surface of the base plate. Spacing blocks 47 are positioned between the lower end portions of the bars 46, and are clamped between the plates 48 and 38 by bolts 49. The bars, therefore, extend vertically upwardly from the base plate with each bar supporting its own weight. Further rigidity is afforded the screen bars 46 and spacer blocks 47 by the bolts 51 extending laterally through the side plates 42 and the bars and blocks. An inclined deflecting plate 52 is mounted on the base plate 38 on the upstream side of and adjacent to the screen bars 46 to prevent the formation of a pocket for refuse along the lower edge of the bar rack 39.

The upper end portions of the side plates 42, best illustrated in Figs. 2 and 5, are supported in fixed spaced relationship by the angle iron 53 which is connected therebetween. The free upper end portions of the screen bars 46 are maintained in proper spaced relationship across the width of the channel by a bar spacer plate 54 having fingers 55 normally positioned between the adjacent screen bars. The end fingers 55 of the plate 54 are provided with wear plates 55a on their bottom surfaces. As illustrated in Figs. 2, 5 and 9, the spacer plate 54 is mounted for pivotal movement on a shaft 56 which is supported at its end portions by the bearings 57 which are, in turn, supported by brackets 58 located at the opposite sides of the channel 13. Pivotal movement of the spacer plate 54 toward a horizontal position is limited by a stop 59 extending across the channel 13 to engage the spacer plate when the fingers 55 are in their proper position between the screen bars 46. The fingers 55, however, may be freely moved from between the bars 46 by pivotal movement of the plate 54 toward a vertical position and will be returned to the proper position between the bars by gravity, as will be further described in a later paragraph.

Refuse collected from the water flowing in the channel 13 by the bar rack 39 is cleaned from the bars by rakes 61 mounted on and carried by a pair of endless chains 62, which are mounted for travel through paths extending downwardly from adjacent the opposite sides of the housing 12 into the outwardly offset portions 63 in the side walls of the channel 13 provided by the foundation 14. Each of the chains 62 is supported by a head sprocket wheel 64 in the upper portion of the housing 12 and a foot sprocket wheel 65 in the outwardly offset portion 63 near the bottom of the channel 13. The head sprocket wheels 64 are keyed to a head shaft 66 having its opposite end portions supported by take-up bearings 67 which are mounted on the flanges 32 of the side walls 15 of the housing. A driven sprocket wheel 68 is keyed to one end of the head shaft 66 externally of the housing 12 and is drivingly connected by a chain 69, or the like, to the sprocket wheel 70 of a speed reducer 71 mounted on the drive supporting platform 25. The speed reducer 71 is, in turn, driven by a motor 72 through a coupling device 73. A drive guard 74 is mounted on the housing 12 to encase the sprockets 58 and 70 and the chain 69.

The foot sprocket wheels 65 rotate on a fixed foot shaft 75 which is supported at its opposite end portions by bearings 76 anchored to the foundation 14 by the bolts 77. The active runs of the chains 62 travel in an upward direction from the foot shaft sprocket wheels 65 to the head shaft sprocket wheels 64, as indicated by the arrows A in Fig. 2, so that the rakes 61 will mesh with the screen bars 46 and travel upwardly therealong for the entire lengths of the bars. The chains 62 are supported for vertical travel through their active runs by the chain guides 78 and through their return runs by the chain guides 79, as is best illustrated in Figs. 2 and 4.

The rakes 61 are provided with fingers 81 properly spaced to coincide with the spaces between the rack bars 46 while passing upwardly along the downstream surface of the bar rack 39. The length of the fingers 81 is such that when the rakes 61 pass along the bar rack 39 they will project outwardly from the upstream surface of the rack to collect the refuse accumulated on the latter and lift it vertically from the channel 13. An angle iron 82, illustrated in Figs. 2, 9, 10 and 11, extends across each rake 61 at the base of the fingers 81 to prevent the refuse collected from spilling off the back of the rake.

Cam plates 83 are suitably connected to the opposite ends of the rakes 61 in such a manner as to extend into the spaces between the side plates 42 and the side walls of the channel 13 when the rakes are moved upwardly along the downstream side of the bar rack 39. The cam plates 83, therefore, cooperate with the side plates 42 to guide the rakes 61. The side plates 42 also protect the cams and chains from any screenings which pass through the bars. The shape and additional functions of the cam plates 83 will be further discussed in a later paragraph.

Lugs 84 are welded to the outer surfaces of the cam plates 83 for connecting the rakes 61 to special attachment links 85 in the chains 62, as illustrated in Figs. 4, 5 and 7. A trip lug 86 also is mounted on each of the cam plates 83 at one end of each rake. The trip lugs 86 engage the operating lever 87 of the limit switch 88 mounted on the back wall 22 of the housing near one side thereof. The limit switch 88 is operatively associated with the motor 72 through wiring, not shown, in such a manner as to prevent discontinuation of operation of the motor while either of the rakes 61 is submerged in the water flowing through the channel 13.

As is best illustrated in Fig. 2, the chains 62, in passing through their active run, will carry the rakes 61 through the position normally occupied by the bar spacer plate 54. As illustrated in Fig. 9, the vertical movement of each rake 61 and its cam plates 83 will move the arcuate camming surfaces 89 of said plates into engagement with the wear plates 55a on the fingers 55 of the bar spacer plate 54. This position is illustrated in the full-line drawing of Fig. 9. Further upward movement of the rake 61 and its attached cam plates 83 will cause pivotal movement of the bar spacer plate 54 to disengage its fingers 55 from between the rack bars 46, as illustrated in the broken line drawing of Fig. 9. At this time, the fingers 81 of the rake 61 will afford lateral support for the upper end portions of the rack bars 46 to replace the lateral support normally afforded by the bar spacer plate 54. As the rake 61 continues to move toward the upper ends of the screen bars 46, the angular camming surfaces 91 of the cam plates 83 will move past the outer ends of the wear plates 55a on the fingers 55 of the bar spacer plate 54 to permit the bar spacer plate to gradually return to its normal position under the force of gravity. The upper end portions of the screen bars 46 are, therefore, continuously maintained in the properly spaced relationship either by the spacer plate 54 or by the rakes 61.

Referring once again to Fig. 2, it will be seen that as each rake 61 approaches the upper ends of the screen bars 46 the arcuate camming surfaces 92 of the cam plates 83 will be carried into engagement with wear plates 93 on the deflector plate 94 which is mounted for pivotal movement by the shaft 95. When in its normal position, as illustrated in the full-lines of Fig. 11, the free edge portion of the deflector plate 94 rests upon stops 96 at the bottom edge of the fixed plate 97. As the cam plates 83 move upwardly, however, the deflector plate 94 will swing upwardly from its normal position to the position illustrated by the broken-lines of Fig. 11.

As the upward movement of the rake 61 continues, the angular camming surfaces 98 will move past the ends of the wear plates 93, as illustrated in Fig. 2, to permit the deflector plate 94 to gradually return to its normal position under the force of gravity. The rake 61 is thereby cut off from the channel 13 so that any refuse subsequently spilled or cleaned from the rake cannot be returned to the channel 13. Further, the sloping deflector plate 94, when in its normal position, will deflect any refuse which is removed or falls from the rake into the screenings pan 29 for subsequent removal and disposal.

During movement of the wear plates 93 along the camming surfaces 93 to return the deflector plate 94 to its normal position, the inclined upper surface of the angle iron 82 on the rake 61 will contact the wiper blade 99 of the wiper mechanism 31, as illustrated in Fig. 2. The wiper blade 99 is carried by a pair of lever arms 101 pivotally mounted on the opposite sides of the housing 12 by brackets 102. The remaining ends of the lever arms 101 are connected by a weighted cross-brace 103 to partially counterbalance the weight of the wiper blade. When the wiper mechanism 31 is in its normal position, the lever arms 101 rest upon stops 104 which are resiliently mounted on brackets 105 on opposite sides of the housing 12. A cam follower plate 106 is mounted on each end of the wiper blade 99 in alinement with the path of travel of the cam plates 83 on the rakes 61.

As each rake 61 is moved upwardly into its position for permitting the return of the deflector plate 94 to its normal position, the wiper blade 99 will move relatively downwardly along the inclined upper surface of the angle iron 82 on the rake. After the wiper blade 99 has reached the edge of the inclined surface of the angle iron 82, as illustrated by the full-line drawing of Fig. 10, and the deflector plate 94 has returned to its normal position, further movement of the rake 61 will effect movement of the wiper blade relatively downwardly along the vertical surface of the angle iron and laterally across the fingers 81 of the rake 61 toward their free end portions. This relative movement between the wiper blade 99 and the rake 61 is illustrated in the broken lines of Fig. 10. Any refuse carried by the rake 61 will thereby be scraped therefrom to drop onto the inclined surface of the deflector plate 94 for deflection into the screenings pan 29. Movement of the wiper blade 99 off of the ends of the rake fingers 81 will permit the lower curved end portion of the cam follower plates 106 to drop into engagement with the arcuate camming surfaces 92 of the cam plates 83. Subsequently sliding engagement between the cam follower plates 106 and the camming surfaces 92 will bring the upper curved end portions of the cam follower plates into engagement with the angular camming surfaces 98 of the cam plates 83 to gradually return the wiper blade 99 to its normal position by gravity.

Referring now to Fig. 2 for a detailed description of the operation of the trash screen, it readily will be apparent that water flowing along the channel 13 in the direction indicated by the arrow B will pass through the bar rack 39 to remove the heavier solids therefrom. The water contacting the chain 62, foot shaft 75 and its sprockets 65 will, therefore, be relatively free of any material which might jam the operation of the screen cleaning rakes 61.

It also will be apparent that, depending upon the amount of refuse which will normally be removed from the water, the chains 62 may be driven by the motor 72 either continuously or intermittently at variable intervals and for varying periods. Further, the number of rakes 61 carried by the chains 62 may be increased or decreased to meet the particular requirements of various screen installations.

Considering now the movement of the rakes 61 when the motor 72 is actuated to drive the chains 62, it will be seen that the rakes are carried downwardly toward the bottom of the channel 13 by the inactive runs of the chains as indicated by the arrows C. Upon reaching the foot sprocket wheels 65, the direction of movement of the chains 62 is reversed with the result that the rakes 61 are successively brought into engagement with the screen bars 46 near their lowermost end portions, as indicated by the broken lines of Fig. 2. The fingers 81 of the rakes intermesh with and project beyond the rack bars 46 at this point to engage and lift from the channel 13 the refuse accumulated on the up-stream side of the bar rack. It is to be noted that the rack bars 46 are at all times supported at their lower end portions only, the spaces between the bars being maintained uniform by the bar spacer plate 54 and the rake fingers 81, as has been previously described.

The vertical movement of the rakes 61 along the active run of the chains 62 will carry each rake successively into the positions normally occupied by the bar spacer plate 54, the pivoted deflector plate 94 and the wiper mechanism 31, as has been previously described in detail. The refuse removed from the rakes 61 by the wiper mechanism 31, after dropping onto the inclined deflector plate 94 for deflection into the screenings pan 29, is periodically removed from the pan and disposed of in any desired manner.

The association between the limit switch 88 and the motor 72 is such that, when it becomes desirable to stop the operation of the cleaning mechanism, the switch operating lever 87 must first be engaged by the cam plate 83 at the end of one of the rakes 61. By this arrangement, neither of the rakes 61 can remain submerged to restrict the flow of water in the channel 13 during those periods in which the rakes are not being moved.

The modification of the invention illustrated in Fig. 12 differs materially from that illustrated in Figs. 1 to 11, inclusive, only in that the screen housing 12 and the elements it encases have been vertically separated from the bar rack 39. Such vertical separation, of course, requires that the chains 62 be increased in length. Since the corresponding elements of both of these modifications of the invention are structurally identical, the reference characters applied to Figs. 1 to 11, inclusive, have been employed to identify the corresponding elements in Fig. 12. For that reason the structure disclosed in Fig. 12 need not be described in detail.

As illustrated in Figs. 2 and 12, the depth of the channel 13 below the level of the floor may vary considerably. It is, therefore, desirable for purposes of economy and standardization that trash screens be adaptable for use in channels of different depths with a minimum amount of modification. The only physical connection between the housing 12 and bar rack 39 being through the chains 62, and the channel walls, it will be apparent that the distance between the bar rack and housing may be varied as required with no material modification of the screen structure other than the lengthening of the chains. The structure of Fig. 12 operates in the same manner as that of Figs. 1 to 11, inclusive.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. A screen for removing solids from a stream of water flowing through a channel, comprising a pair of vertical side plates mounted on the side walls of the channel, a plurality of spaced vertical rack bars arranged between said side plates and rigidly supported at their lower end portions only, spacer means pivotally mounted adjacent the upper end portions of said bars for movement into and out of the spaces between the bars to provide lateral support for said upper end portions, cleaning means mounted for movement through a closed path on the downstream side of the rack bars and extending from the lower end portions to a point above the upper end portions of said bars, said cleaning means having teeth adapted to extend through the spaces between the bars to lift the solids accumulated on the upstream side of said bars from the stream, means for moving said cleaning means, deflecting means pivotally mounted for movement into and out of the path of travel of said cleaning means above the upper end portions of said bars, means coacting with said cleaning means for engaging and moving said spacer and deflecting means while the cleaning means is moved through those portions of its path in which the spacer and deflecting means normally lie, and scraper means mounted above said deflecting means and actuated by movement of the cleaning means to scrape solids from the latter onto the deflecting means, said deflecting means directing the solids away from the path of said cleaning means.

2. A screen for removing solids from a stream of water flowing through a channel, comprising a pair of vertical side plates mounted on the side walls of the channel, a plurality of spaced vertical rack bars arranged between said side plates and rigidly supported at their lower end portions only, a spacer plate pivotally mounted adjacent the upper end portions of said bars and having fingers projecting from its edge portion for movement into and out of the spaces between the bars to provide lateral support for said upper end portions, a rake mounted on a plurality of endless chains for movement through a closed path on the downstream side of said bars and extending from the lower end portions to a point above the upper end portions of said bars, said rake having teeth adapted to extend through the spaces between the bars to lift solids accumulated on the upstream side of said bars from the stream, means for moving said rake through its closed path, deflecting means pivotally mounted for movement into and out of the path of said rake above the upper end portions of said bars, means coacting with said rake for engaging and moving said spacer plate and said deflecting means while the rake is moved through those portions of its path in which the spacer plate and deflecting means normally lie, and scraper means mounted above said deflecting means and actuated by movement of the rake to scrape the solids from the latter onto the deflecting means, said deflecting means directing the solids away from the path of said rake.

3. A screen for removing solids from a stream of water flowing through a channel, comprising a pair of vertical side plates mounted on the side walls of the channel and having their downstream edge portions offset from the walls of the channel, a plurality of spaced vertical rack bars arranged between said side plates and rigidly supported at their lower end portions only, spacer means pivotally mounted adjacent the upper end portions of said bars for movement into and out of the spaces between the bars to provide lateral support for said upper end portions, cleaning means mounted for movement through a closed path on the downstream side of the rack bars and extending from the lower end portions to a point above the upper end portions of said bars, said cleaning means having teeth adapted to extend through the spaces between the bars to lift the solids accumulated on the upstream side of said bars from the stream, means for moving said cleaning means, deflecting means pivotally mounted for movement into and out of the path of travel of said cleaning means above the upper end portions of said bars, a pair of cams mounted on opposite ends of said cleaning means for entering the space between offset edge portions of said side plates and the walls of the channel to provide lateral support for the cleaning means during movement of the latter along said rack bars, said cams also engaging and moving said spacer and deflecting means while the cleaning means is moved through those portions of its path in which the spacer and deflecting means normally lie, and scraper means mounted above said deflecting means and actuated by movement of the cleaning means to scrape the solids from the latter onto the deflecting means, said deflecting means directing the solids away from the path of said rake.

4. A screen for removing solids from a stream of water flowing through a channel, comprising a pair of vertical side plates mounted on the side walls on the channel and having their downstream edge portions offset from the walls of the channel, a plurality of spaced vertical rack bars arranged between said side plates and rigidly supported at their lower end portions only, a spacer plate pivotally mounted adjacent the upper end portions of said bars and having fingers projecting from its edge portion for movement into and out of the spaces between the bars to provide lateral support for said upper end portions, a rake mounted on a plurality of endless chains for movement through a closed path on the downstream side of said rack bars and extending from the lower end portions to a point above the upper end portions of said bars, said rake having teeth adapted to extend through the spaces between the bars to lift solids accumulated on the upstream side of said bars from the stream, a motor for driving said chains to move the rake through its closed path, a deflecting plate mounted for pivotal movement into and out of the path of said rake above the upper end portions of said bars, a pair of cams mounted on opposite ends of said rake for entering the space between the offset edge portions of said side plates and the walls of the channel to provide lateral support for the rake during its movement along said bars, said cams also engaging and moving said spacer and deflecting plates while the rake is moved through those portions of its path in which the spacer and deflecting plates normally lie, and a scraper pivotally mounted above said deflecting plate and actuated by engagement with the rake for movement across said teeth to displace the solids from the latter onto the deflecting plate, said deflecting plate directing the solids away from the path of the rake.

5. A screen for removing solids from a stream of water flowing through a channel, comprising a pair of vertical side plates mounted on the side walls of the channel, the upstream edge portions of said plates being in contact with and the downstream edge portions being spaced from the channel walls, a plurality of spaced vertical rack bars arranged between said side plates and rigidly supported at their lower end portions only, spacer means pivotally mounted adjacent the free upper end portions of said rack bars for movement into and out of the spaces between the bars to provide lateral support for their upper end portions, cleaning means mounted for vertical movement through the spaces between said bars, means coacting with said cleaning means for movement through the spaces between the channel walls and the downstream edge portions of said side plates to guide said cleaning means while the latter is moved through the spaces between said bars, and means for moving said cleaning means, movement of said cleaning means and its coacting guide means into engagement with said spacer means effecting pivotal movement of the latter out of the spaces between the bars.

6. A screen for removing solids from a stream of water flowing through a channel, comprising a pair of vertical side plates mounted on the side walls of the channel, the upstream edge portions of said plates being in contact with and the downstream edge portions being spaced from the channel walls, a plurality of spaced vertical rack bars arranged between said side plates and rigidly supported at their lower end portions only, spacer means pivotally mounted adjacent the free upper end portions of said bars for movement into and out of the spaces between the bars to provide lateral support for their upper end portions, a rake mounted for vertical movement along the downstream side of said bars and having teeth projecting through the spaces between the bars, a pair of cams mounted on the opposite ends of said rake for movement through the spaces between the channel walls and the downstream edge portions of said side plates to laterally guide the rake along the downstream side of said bars, and means for moving said rake, movement of said rake and its associated cams into engagement with said spacer means effecting pivotal movement of the latter out of the spaces between the bars and movement of said rake and cams out of engagement with said spacer means permitting the latter to re-enter the spaces between the bars while the upper end portions of the bars are laterally supported by said rake.

7. A screen for removing solids from a stream of water flowing through a channel, comprising a plurality of spaced vertical rack bars arranged laterally across the channel and rigidly supported at their lower end portions only, a spacer plate mounted for pivotal movement about an axis adjacent the downstream side of the free upper end portions of said bars and having separating fingers along one edge portion movable into the spaces between the rack bars by gravitationally actuated pivotal movement of the plate, said separating fingers providing lateral support for the upper end portions of said rack bars when positioned therebetween, a rake mounted for vertical movement along the downstream side of said rack bars and having teeth projecting through the spaces between the bars, a prime mover for moving said rake, and a pair of cams mounted on the opposite ends of said rake for engaging and moving said spacer plate to remove the separating fingers from the spaces between the rack bars only while the rake is passing between the bars and the spacer plate is laterally supporting the upper end portions of said bars.

8. A screen for removing solids from a stream of water flowing through a channel, comprising a plurality of spaced vertical rack bars arranged laterally across the channel and rigidly supported at their lower end portions only, spacer means pivotally mounted adjacent the free upper end portions of said bars for movement into and out of the spaces between the bars to provide lateral support for their upper end portions, cleaning means mounted for vertical movement through the spaces between said rack bars, and means for moving said screen cleaning means, said spacer means being actuated by said cleaning means for movement out of the spaces between said rack bars only while the cleaning means is moved past the spacer means.

9. A screen for removing solids from a stream of water flowing through a channel, comprising a plurality of spaced vertical rack bars arranged laterally across the channel and rigidly supported at their lower end portions only, a spacer plate mounted for pivotal movement about an axis adjacent the downstream side of the free upper end portions of said rack bars and having separating fingers along one edge portion movable into the spaces between the bars by gravitationally actuated pivotal movement of the plate, said separating fingers providing lateral support for the upper end portions of said rack bars when positioned therebetween, cleaning means mounted for vertical movement through the spaces between said rack bars, and means for moving said cleaning means, movement of said cleaning means actuating said spacer plate for pivotal movement to remove said separating fingers from the spaces between the bars only while the cleaning means is moved past the spacer plate.

10. In a screen for removing solids from a stream of water flowing through a channel, the improvement which comprises a plurality of spaced vertical rack bars arranged laterally across the channel, means rigidly connecting only the lower end portions of said rack bars to the bottom of the channel, the remaining unsupported portions of said bars being capable of flexing relative to each other, and spacer means mounted at a fixed location adjacent the free upper end portions of said rack bars on one side of the screen for free movement into and out of the spaces between the bars from said one side of the screen to provide lateral support for their upper end portions.

11. In a screen for removing solids from a stream of water flowing through a channel, the improvement which comprises a plurality of spaced vertical rack bars arranged laterally across the channel, a clamp rigidly connecting the lower end portions of said rack bars to the bottom of the channel, and a spacer plate pivotally mounted for movement about a fixed axis adjacent the downstream side of the free upper end portions of said rack bars and having spacing fingers along one edge portion freely movable into and out of the spaces between the bars to provide lateral support for their upper end portions.

12. A screen for removing solids from a stream of water flowing through a channel, comprising a plurality of spaced rack bars arranged laterally across the channel and rigidly supported at their lower end portions only, spacer means mounted adjacent the free upper end portions of said rack bars for movement into and out of the spaces between the bars to provide lateral support for their upper end portions, cleaning means mounted for movement through the spaces between said bars, means for moving said cleaning means, and means for moving said spacer means out of the spaces between the bars only while the cleaning means is moved past the spacer means.

CHARLES J. BENNER, Jr.

References Cited in the file of this patent
UNITED STATES PATENTS

| Number | Name | Date |
| --- | --- | --- |
| 1,529,602 | Maine | Mar. 10, 1925 |
| 1,585,157 | Lee | May 18, 1926 |
| 2,078,127 | Dalton | Apr. 20, 1937 |
| 2,128,347 | Briggs | Aug. 30, 1938 |
| 2,128,348 | Briggs | Aug. 30, 1938 |
| 2,307,601 | Nichols | Jan. 5, 1943 |
| 2,335,573 | Scott | Nov. 30, 1943 |
| 2,379,615 | Walker | July 3, 1945 |